(12) United States Patent
Khoury

(10) Patent No.: US 7,081,223 B2
(45) Date of Patent: Jul. 25, 2006

(54) METHOD FOR MANUFACTURING A ROTATABLE PLUG ELEMENT AND VALVE

(75) Inventor: David Khoury, Covina, CA (US)

(73) Assignee: Robertshaw Controls Company, Richmond, VA (US)

( * ) Notice: Subject to any disclaimer, the term of this patent is extended or adjusted under 35 U.S.C. 154(b) by 0 days.

(21) Appl. No.: 10/717,857

(22) Filed: Nov. 19, 2003

(65) Prior Publication Data

US 2004/0112562 A1 Jun. 17, 2004

Related U.S. Application Data

(63) Continuation of application No. 09/684,450, filed on Oct. 6, 2000, now abandoned.

(51) Int. Cl.
*B29C 45/14* (2006.01)

(52) U.S. Cl. .................. 264/242; 264/250; 264/254; 264/255; 264/267; 164/94; 164/DIG. 13

(58) Field of Classification Search ................ 264/242, 264/250, 254, 255, 259, 264, 267, 268, 271.1, 264/275; 251/310, 314, 317, 904; 164/47, 164/94, DIG. 13
See application file for complete search history.

(56) References Cited

U.S. PATENT DOCUMENTS

| 2,961,214 | A |   | 11/1960 | Freed |              |
|-----------|---|---|---------|-------|--------------|
| RE25,560  | E | * | 4/1964  | Gifford | 29/890.127 |
| 3,293,342 | A | * | 12/1966 | Grove | 264/157    |
| 3,861,646 | A | * | 1/1975  | Douglas | 251/356  |
| 4,169,491 | A |   | 10/1979 | Bajka |              |
| 4,269,802 | A | * | 5/1981  | Linne | 264/255    |
| 4,410,479 | A | * | 10/1983 | Cyriax | 264/255   |
| 4,468,367 | A | * | 8/1984  | Beune et al. | 264/255 |
| 4,494,730 | A | * | 1/1985  | George | 251/309   |
| 4,671,915 | A | * | 6/1987  | Fujimoto et al. | 264/162 |
| 4,705,058 | A | * | 11/1987 | Marklew | 137/15.24 |
| 4,743,422 | A | * | 5/1988  | Kalriis-Nielsen et al. | 264/255 |
| 4,809,949 | A | * | 3/1989  | Rakieski | 251/310 |

FOREIGN PATENT DOCUMENTS

| DE | 19728234 A1 |   | 3/1999 |
|----|-------------|---|--------|
| EP | 0581637 A1  |   | 2/1994 |
| FR | 2473672     |   | 7/1981 |
| WO | WO 91/06797 | * | 5/1991 |

* cited by examiner

*Primary Examiner*—Angela Ortiz
(74) *Attorney, Agent, or Firm*—Leydig, Voit & Mayer, Ltd.

(57) ABSTRACT

A valve for controlling the flow of a gas therethrough which requires no machining in order to attain an effective seal between the valve seating surface and a rotatable plug element. The valve seat surface remains as cast while the plug consists of an overmolded plastic. The overmolding defines an array of pliable sealing ridges. The use of overmolding facilitates the use of cost-saving plastic materials, and obviates the need for expensive machining of the cooperating surfaces.

4 Claims, 4 Drawing Sheets

METHOD FOR MANUFACTURING A ROTATABLE PLUG ELEMENT AND VALVE

CROSS REFERENCE TO RELATED APPLICATION

This patent application is a continuation application of U.S. patent application Ser. No. 09/684,450 filed Oct. 6, 2000, now abandoned.

BACKGROUND OF THE INVENTION

The present invention generally relates to the construction of valves such as are used to control the flow of combustible gas-to-gas-fired appliances and more particularly pertains to improvements in the configuration and construction of such valves in order to reduce the cost of their manufacture.

Regulating authorities typically mandate that valves that are to be used to control the flow of a combustible gas to a gas-fired appliance, such as for example a furnace, water heater or gas-burning fireplace, must be capable of maintaining their integrity when subjected to high temperatures such as may be encountered during a fire so as to preclude the external leakage of gas. This is intended to prevent a fire from being aggravated by the supply of additional fuel leaking from a fire-damaged valve. A side effect of such requirement is that it also typically serves to limit the type of materials that are used in the construction of such valves.

In view of the requirements with respect to fire resistance, valves that are subject to the regulations vis-a-vis high temperature resistance are typically predominantly constructed of metal wherein the melting temperature of such metal exceeds the temperature it is to be exposed to during fire testing. Metal-to-metal contact is relied upon between adjacent components in an assembled valve in order to effect a seal or are adjacent components are sufficiently dimensionally matched such that the failure of any gaskets or seals that may be positioned therebetween would result in minimal, i.e. acceptable, rates of leakage. The failure of gaskets or seals used in the interior of such valves to control the flow of gas through the valve would at worst merely result in the flow of additional gas to the burner where its combustion is adequately provided for and where it would thus not pose an additional hazard during a fire.

The construction of such valves has heretofore called for the manufacture of very tightly dimensioned metal components that require the machining of various cast parts to very close tolerances. Many stopcock configurations employ a conical plug that is rotatably received in a conical cavity formed in a valve body. The plug has an orifice formed in its side that is in fluid communication with an opening formed at its narrow end. The valve body has one duct formed therein that extends from an exterior port to an opening formed in the side of the conical cavity and another that extends from an opening in the base of the conical cavity to a second exterior port. Rotation of the plug so as to align the orifice formed on its side with the opening formed in the side of the conical cavity in the valve body establishes a flow path through the valve. Rotation of the plug so as to avoid any overlap between the orifice formed in the side of the plug and the opening formed in side of the conical cavity serves to positively shut off the flow of gas through the valve.

The interior surface of the conical cavity thus serves as a valve seat for the exterior surface of the plug whereby an effective seal is achieved with the very precise machining of the two surfaces. Machining of the cast metallic components to within 0.001" is typically followed by a lapping operation to substantially perfectly match the two surfaces. The use of metals and the machining of the various components significantly contribute to the overall cost of such valve. Even minor variations in the machining process contribute to a high rejection rate that further affects the overall cost of manufacture.

A valve is needed that is less expensive to manufacture than heretofore known valves while retaining the ability to control the flow of gas therethrough. More particularly, a valve configuration is needed that obviates the various machining and matching operations that are currently needed to in order to achieve a proper seal. Additionally, a valve configuration is needed that reduces the number of cast metal parts that are needed without compromising the valve's ability to resist external leakage upon being subjected to the elevated temperatures it is subjected to during a fire test.

SUMMARY OF THE INVENTION

The present invention provides a gas valve that includes a conical rotatable plug component that is received in a conical cavity formed in a valve body wherein neither the surface of the plug nor the surface of the cavity require machining in order to achieve an effective seal therebetween. Moreover, the configuration of the valve permits the use of molded plastic rather than cast metal in the construction of the plug. The plug serves to establish a flow path through the valve body when rotated so as to align an opening formed in the cavity wall with an orifice formed in the side of the plug. A rotational orientation in which there is no overlap between the opening in the wall and the orifice in the plug shuts off all flow through the valve.

An effective seal is achieved between the plug and the wall of the conical cavity by an array of rubber sealing ridges that are overmolded onto the plug. The compliance of the rubber obviates the need for it to engage an ultra-smooth mating surface in order to achieve a seal. As a consequence, the surface of the cavity wall does not require machining and thus remains in its as-cast state. The surface of the plug does not engage the surface of the wall cavity as it merely serves as a support for the overmolding. As a consequence, machining of the plug surface is not necessary and it may be used in its as-cast or as-molded state. Moreover, since direct plug to cavity wall contact is not relied upon to achieve a seal, the dimensional stability afforded by the use of metal in the manufacture of the plug is not necessary and a plastic can be substituted therefor. While the plastic plug is expected to fail when subjected to the elevated temperature of a fire test, the metal valve body and metal cap that completely encapsulate the plug preclude such failure from resulting in any significant external leakage.

The plug component of the valve of the present invention is an injection-molded plastic part that is overmolded with a pliable rubber-like material. The overmolding is configured to provide an array of raised ridges that extend both circumferentially as well as longitudinally about the surface of the plug. Circumferential ridges about the wide and the narrow end of the conical plug prevent the escape of gas into the space between the plug and cavity wall. Longitudinally oriented ridges prevent the escape of gas from the space between the plug and cavity wall into the outlet port. A closely spaced second ridge may extend along each of the vertical and horizontal ridges for the purpose of redundancy and for enhancing the robustness of the valve.

These and other features and advantages of the present invention will become apparent from the following detailed description of a preferred embodiment which, taken in conjunction with the accompanying drawings, illustrates by way of example the principles of the invention.

DETAILED DESCRIPTION OF THE INVENTION

The valve of the present invention is especially suited for controlling the flow of a combustible gas to gas-fired appliances such as a furnace, water heater or gas-burning fireplace. The valve configuration obviates the need to rely on machined surfaces in order to establish seals between moving parts within the valve and further allows the use of plastic in the construction of certain components within the valve.

Figure 1:
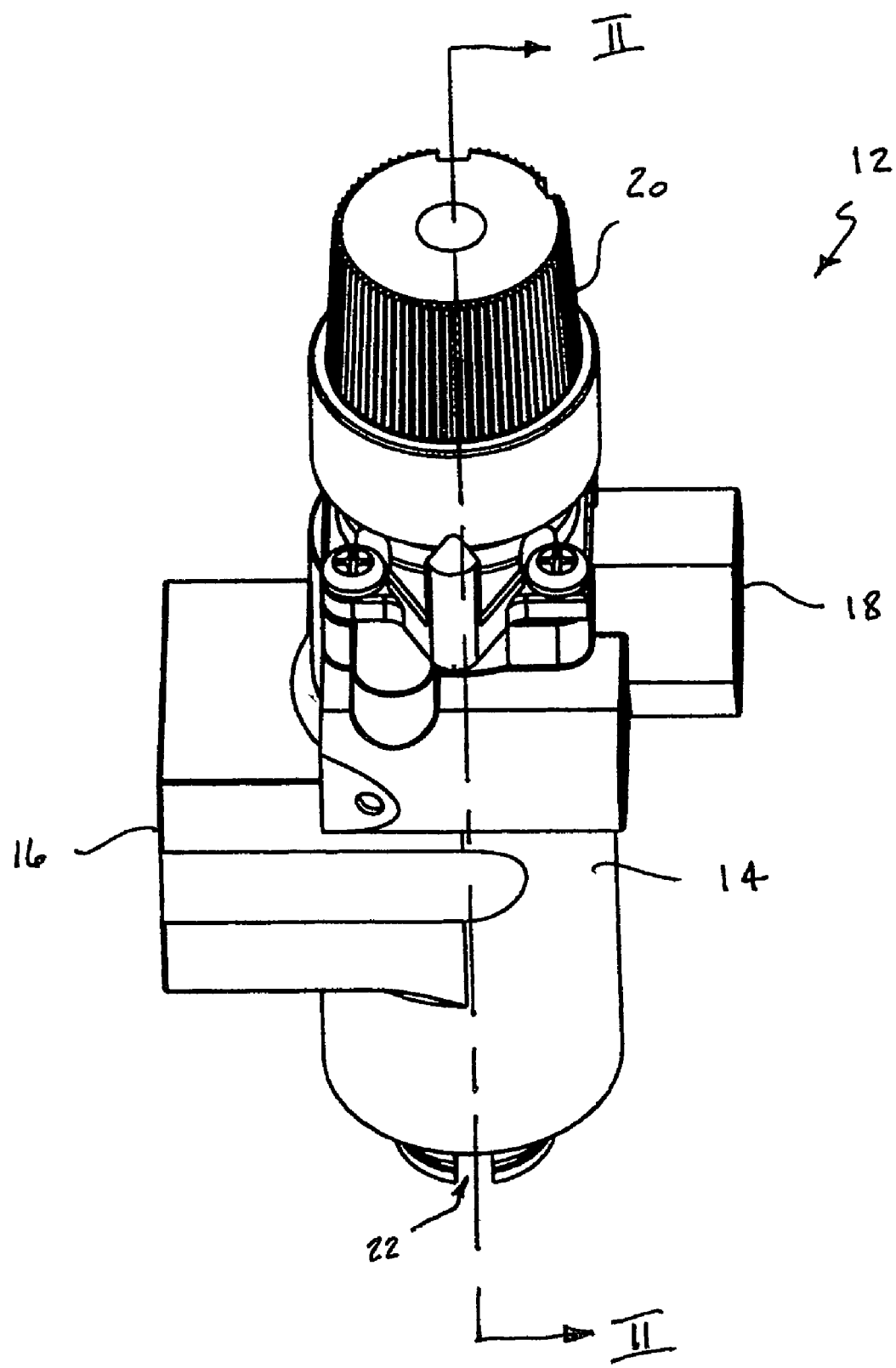
FIG. 1 is a perspective view of the valve of the present invention.

FIG. 1 is a perspective view of a valve of the present invention. The valve 12 includes a valve body 14, an inlet port 16 and an outlet port 18. Control knob 20 is rotatable and depressible to enable manual actuation of the valve. In the particular embodiment shown, a thermocouple-powered electromagnet is insertable into a bore 22 formed at the base of the valve body.

Figure 2:
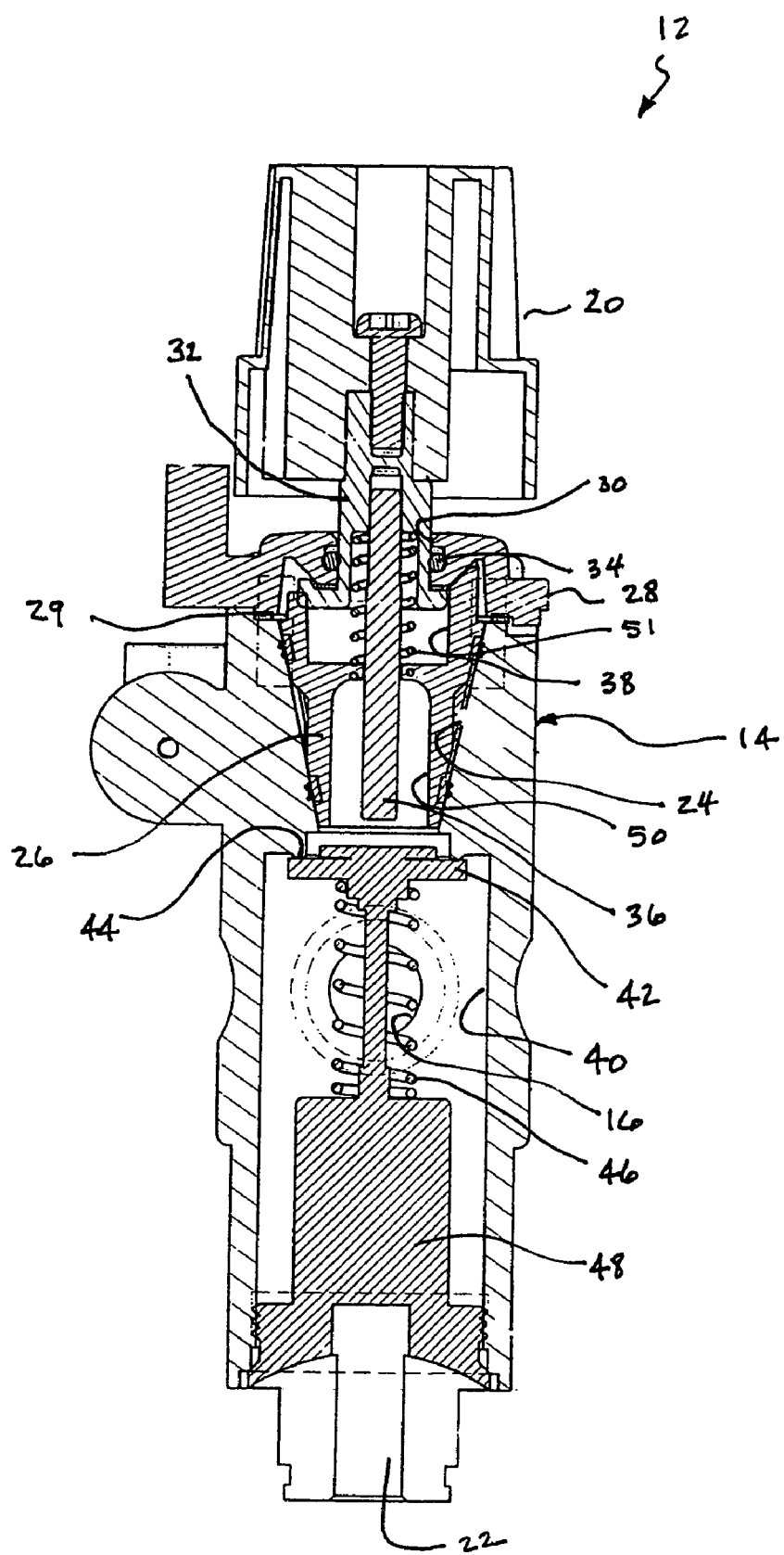
FIG. 2 is a slightly enlarged cross-sectional view of the valve taken along lines II—II of FIG. 1.

FIG. 2 is a cross-sectional view of the valve shown in FIG. 1 taken along lines II—II. A conical cavity 24 is formed in the valve body 14 and is dimensioned to receive rotatable plug element 26 therein. Endcap 28 is attached to the top of the valve body to serve as an end wall for cavity 24 and to thereby enclose plug element 26. An aperture 30 formed in the center of the endcap permits the extension of stem 32 therethrough so as to be rotatable and longitudinally shiftable. O-ring 34 achieves a positive seal between stem 32 and end cap 28. Push rod 36 is attached to stem 32 and extends through the center of the plug element through which it is longitudinally shiftable. Compression spring 38 is nested in the interior of the stem and serves to bias plug element 26 into the cavity 24. A hole (not visible) and conduit formed in the side of conical cavity is in fluid communication with outlet port 18. The base of the conical cavity opens into chamber 40, which is in fluid communication with inlet port 16. Valve 42 seals off chamber 40 from cavity 24 when urged against valve seat 44 by spring 46. Bore 22 is configured to receive an electromagnet for holding valve 42 in its open position when energized by a thermocouple.

Figure 3:
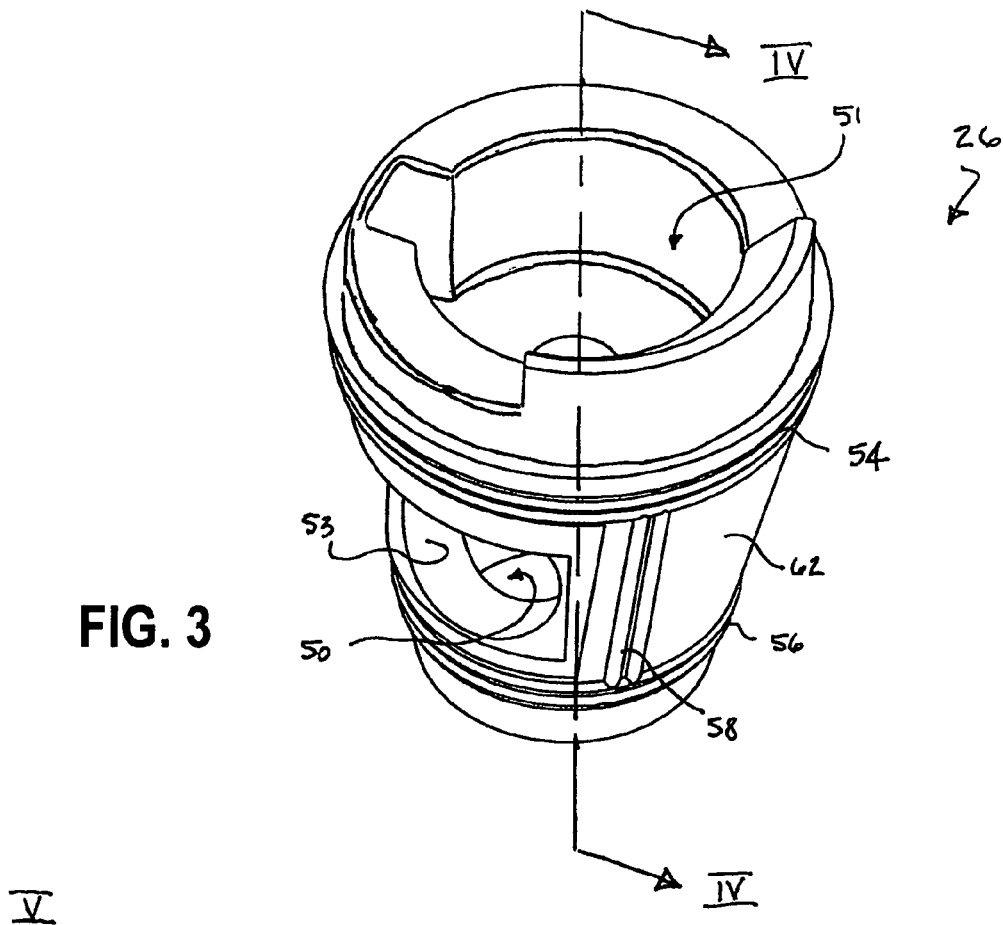
FIG. 3 is an enlarged perspective view of the plug element of the valve of the present invention.
Figure 4:
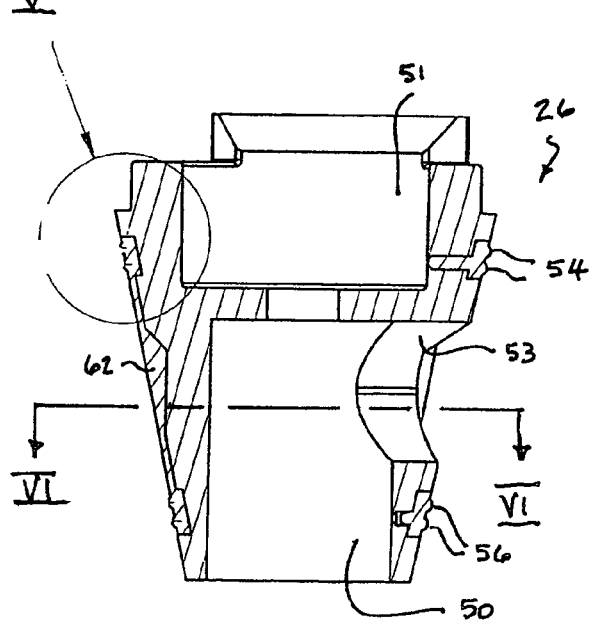
FIG. 4 is a cross-sectional view of the plug element taken along lines IV—IV of FIG. 3.

FIG. 3 is an enlarged perspective view of plug element 26, while FIG. 4 is a cross-section thereof. The plug has a conical outer surface and a hollow interior that is divided into an open lower chamber 50 and open upper chamber 51. An orifice 53 formed in the side of the plug extends into its hollow interior. An array of sealing ridges are formed on the exterior surface of the plug including a circumferential pair of sealing ridges 54 about the wide end of the plug and a circumferential pair of sealing ridge 56 about the narrow end of the plug. At least two longitudinally oriented pairs of sealing ridges 58, 60 extend between the two pairs of circumferential sealing ridges. Additional sealing ridges (e.g. 61) may be formed on the surface of the plug. The sealing ridges are formed as part of an over-molded layer 62 of silicon rubber that covers most of the plug. The overmolded layer is at least 0.015" thick while the ridges extend outwardly beyond the conical surface defined by the overmolded and exposed portions of the plug element to a height of approximately 0.008". Single as well as paired ridges may be employed to form the required seals, as may different types of rubber and rubber-like materials.

Figure 5:
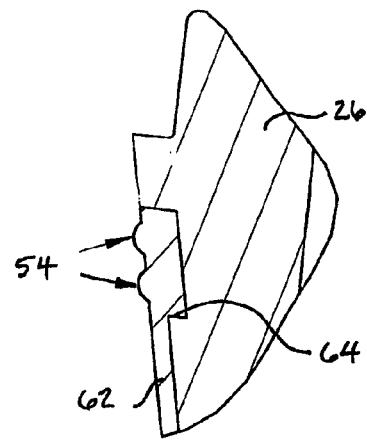
FIG. 5 is an enlarged cross-sectional view of the section of the plug element within circle V of FIG. 4.

FIG. 5 is an enlargement of the circled portion shown in FIG. 4. The illustration shows the cross-sectional configuration of the paired sealing ridges 54 and further shows an undercut 64 formed in the plug itself. The undercuts extend across the surface of the plug directly below each of the sealing ridges to ensure that a positive bond and a mechanical interlocking with the plastic is achieved and further serve to enhance the pliability of the sealing ridges. Additional undercuts may be formed at various locations about the surface of the plug to provide further anchoring points for the overmolding.

Figure 6:
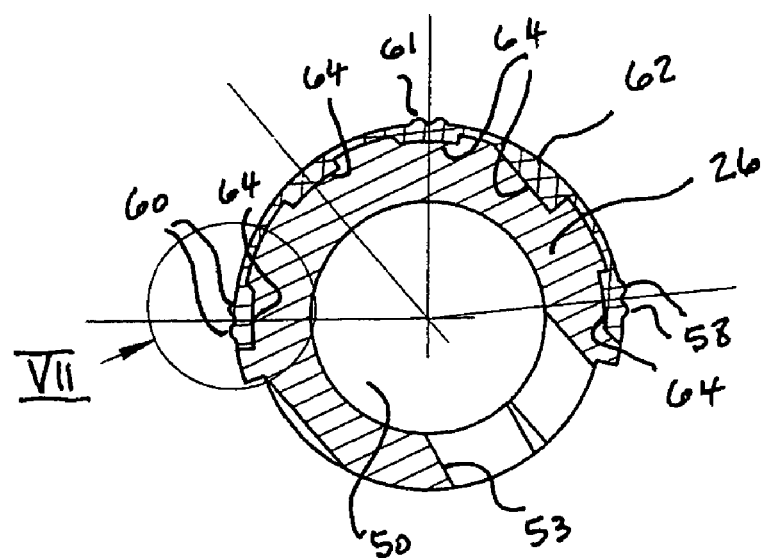
FIG. 6 is a cross-sectional view of the plug element taken along lines VI—VI of FIG. 4.

FIG. 6 is a cross-sectional view taken perpendicular to the longitudinal axis of the plug 26. This view clearly shows the longitudinal ridge pairs 58, 60 that are positioned on either side of orifice 53. An additional ridge pair 61 is shown disposed therebetween. Multiple undercuts 64 are visible at numerous locations about the plug's surface so as to ensure a secure bond and mechanical interlocking with the overmolding 62 as well as to impart additional pliability to the sealing ridges. The overmolding is at least 0.015" thick and substantially thicker within the undercuts 64. The ridges 58, 60, 61 extend beyond the conical surface by 0.008".

Figure 7:
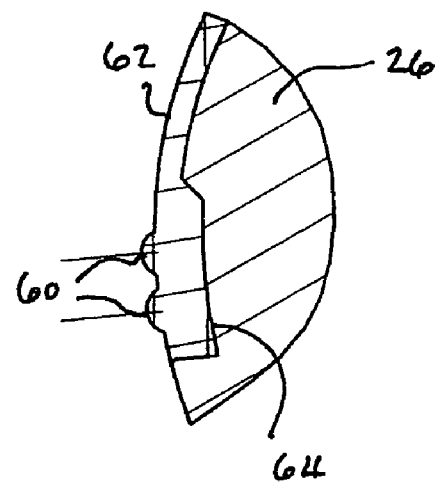
FIG. 7 is an enlarged cross-sectional view of the section of the plug element within circle VII of FIG. 6.

FIG. 7 is a further enlarged cross-sectional view of the section circled in FIG. 6. Ridge pairs 60 protruding from the surface of the overmolding 62 and beyond the surface of the plug 26 are clearly visible as is undercut 64 that is positioned directly below the sealing ridges.

The valve of the present invention is manufactured using well known metal casting, plastic molding and overmolding techniques. The valve body 14 and end cap 28 are cast of an aluminum alloy. The conical cavity 24 is cast into the valve body and is used in its as-cast condition without any machining of its interior surface. The plug element 26 is formed of a molded plastic such as a polyphthalamide (e.g. AS-1566 HS) which is selected for its low shrink rate, its ability to withstand high temperatures of up to 520° F. and the strong bond it forms with silicone rubber. The molded plug element is subsequently subjected to the overmolding process without any machining of the plug elements exterior surface. The preferred overmolding material is a silicone rubber, which is selected for its ability to bond with the plastic plug, its imperviousness to methane, and its pliability throughout a wide temperature range. Various silicone rubbers may be used as well as other rubber-like materials. During assembly, a lubricant that is compatible with both the plastic and the rubber sealing ridges is preferably applied to the plug to provide lubrication and to prevent galling.

In use, the valve 12 positively precludes the passage of gas from the inlet port 16 to the outlet port 18 by rotation of the plug element 26 via knob 20 to a position in which there is no overlap between the opening formed in the side of the conical cavity 24 and orifice 53 formed in the side of the plug. Sealing ridges 54, 56, 58, 60 completely surround the opening while the bias generated by spring 38 ensures that sealing ridges firmly come to bear on the cavity wall. The circumferential sealing ridges 54, 56 in concert with the vertical sealing ridges 58, 60 and any additional ridges that may extend between the circumferential sealing ridges ensure that no gas can reach the hole formed on the side of the conical cavity 24. The use of ridge pairs rather than a single ridge configuration enhances the robustness of the valve and provides redundancy in the sealing mechanism.

When knob 20 is depressed, push rod 36 transfers pressure to the supplemental valve 42 to overcome the force exerted by spring 46 and allow the supplemental valve to open. Further rotation of the knob serves to rotate the plug 26 to a position wherein orifice 53 overlaps with the opening formed in the side of the cavity wall. A flowpath through the entire valve is thereby established to set the inlet valve 16 into fluid communication with the outlet valve 18. Gas will freely be admitted from inlet port 16 and chamber 40 into the interior of plug 26, out through orifice 53 and on into outlet port 18. Once a flame has been established at the burner and a thermocouple or thermopile is able to generate sufficient power to energize an electromagnet received in bore 22 to hold valve 42 in its open position, pressure on knob 20 can be released and the valve will remain fully open until either the knob is rotated back into its closed position or when power to the electromagnet is discontinued.

In the event the valve is subjected to extreme temperatures such as may be encountered during a fire, failure of all non-metallic parts including the plug element 26 can be expected. However, in view of the fact that the interior of the plug is entirely encapsulated by metallic elements, no appreciable external leakage will result. The tight tolerances between the valve body 14 and end cap 28 as well as the end cap 28 and stem 32 will ensure that only acceptable rates of leakage may occur despite the failure of gasket 29 or O-ring 34. Such gasket and O-ring serve to ensure zero-leakage during the normal service life of the valve.

While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. A process for manufacturing a valve, comprising:
    casting a valve body without machining, wherein the valve body includes a conical cavity formed in the valve body, wherein an opening in a side of the conical cavity is in fluid communication with an exterior of the valve body and an opening in a base of the conical cavity is in fluid communication with the exterior of the valve body;
    molding a plug element without machining, wherein the plug element is configured and dimensioned for rotatable receipt within the conical cavity for the valve body, wherein the molding of the plug element further includes forming an orifice in a side of the plug element that is alignable with the opening in a side of the conical cavity for the valve body and in fluid communication therewith and the orifice in a side of the plug element is alignable with an opening in a narrow end of the plug element and in fluid communication therewith;
    overmolding pliable material without machining, having a plurality of sealing ridges protruding therefrom, wherein at least one sealing ridge of the plurality of sealing ridges extends circumferentially about the plug element above the orifice in the side of the plug element and at least one sealing ridge of the plurality of sealing ridges extends circumferentially about the plug element below the orifice in the side of the plug element and at least two sealing ridges of the plurality of sealing ridges extend between the circumferentially oriented sealing ridges with at least one sealing ridge on each side of the orifice in the side of the plug element; and
    positioning a biasing mechanism between the plug element and the conical cavity for the cast valve body, whereby an effective seal is achieved between the plurality of sealing ridges and the unmachined surface of the opening in the side of the conical cavity for the valve body.

2. A process for manufacturing a rotatable plug element for receipt in a conical cavity formed in a valve body, wherein an opening in a side of the conical cavity is in fluid communication with an exterior of the valve and an opening in a base of the conical cavity is in communication with the exterior of the valve, comprising:
    molding a plug element without machining, wherein the plug element includes a rigid support structure with a conical exterior surface and a hollow interior with a first opening on a side of the rigid support structure and a second opening on a narrow end of the rigid support structure; and
    molding of an array of pliable sealing ridges attached onto the conical exterior surface of the rigid support structure including at least two circumferentially extending pliable sealing ridges with at least one pliable sealing ridge of the at least two circumferentially extending pliable sealing ridges positioned on each side of the first opening formed in the side of the rigid support structure, wherein the molding of the array of pliable sealing ridges includes forming an overmolding with the array of pliable sealing ridges that extends across a substantial portion of the conical exterior surface of the rigid support structure, wherein the molding of an array of pliable sealing ridges includes forming the array of the pliable sealing ridges so that the array of the pliable sealing ridges extends above the rigid support structure of the plug element by about 0.008 inches;
    wherein the molding of the plug element without machining includes undercutting portions of the rigid support structure located directly below the overmolding formed from the array of pliable sealing ridges to increase depth of the overmolding below at least one pliable sealing ridge of the array of pliable sealing ridges.

3. A process for manufacturing a rotatable plug element for receipt in a conical cavity formed in a valve body, wherein an opening in a side of the conical cavity is in fluid communication with an exterior of the valve and an opening in a base of the conical cavity is in communication with the exterior of the valve, comprising:
    molding a plug element utilizing a thermoplastic without machining, wherein the plug element includes a rigid support structure with a conical exterior surface and a hollow interior with a first opening on a side of the rigid support structure and a second opening on a narrow end of the rigid support structure; and
    molding of an array of pliable sealing ridges utilizing silicone rubber attached onto the conical exterior surface of the rigid support structure including at least two circumferentially extending pliable sealing ridges with at least one pliable sealing ridge of the at least two circumferentially extending pliable sealing ridges positioned on each side of the first opening formed in the side of the rigid support structure.

4. A process for manufacturing a valve, comprising:

casting an aluminum valve body without machining, wherein the aluminum valve body includes a conical cavity formed in the aluminum valve body, wherein an opening in a side of the conical cavity is in fluid communication with an exterior of the aluminum valve body and an opening in a base of the conical cavity is in fluid communication with the exterior of the aluminum valve body;

molding a thermoplastic plug element without machining, wherein the plug element is configured and dimensioned for rotatable receipt without the conical cavity for the aluminum valve body, wherein the molding of the thermoplastic plug element further includes forming an orifice in a side of the plug element that is alignable with the opening in a side of the conical cavity for the aluminum valve body and in fluid communication therewith and the orifice in a side of the plug element is alignable with an opening in a narrow end of the thermoplastic plug element and in fluid connection therewith;

overmolding pliable material without machining, having a plurality of sealing ridges protruding therefrom, wherein at least one sealing ridge of the plurality of sealing ridges extends circumferentially about the plug element above the orifice in the side of the plug element and at least one sealing ridge of the plurality of sealing ridges extends circumferentially about the plug element below the orifice in the side of the plug element and at least two sealing ridges of the plurality of sealing ridges extend between the circumferentially oriented sealing ridges with at least one sealing ridge on each side of the orifice in the side of the plug element; and positioning a compression spring between the plug element and the conical cavity for the cast aluminum valve body, whereby an effective seal is achieved between the plurality of sealing ridges and the unmachined surface of the opening in the side of the conical cavity for the aluminum valve body.

* * * * *